No. 741,615.  
Patented October 20, 1903.

UNITED STATES PATENT OFFICE.

JOHANN GOTTLIEB BEHRENS AND AUGUST BEHRENS, JR., OF BREMEN, GERMANY.

PROCESS OF MAKING ACETIC ACID.

SPECIFICATION forming part of Letters Patent No. 741,615, dated October 20, 1903.

Application filed October 22, 1902. Serial No. 128,324. (No specimens.)

*To all whom it may concern:*

Be it known that we, JOHANN GOTTLIEB BEHRENS and AUGUST BEHRENS, Jr., subjects of the German Emperor, and residents of Bremen, Germany, have invented certain new and useful Improvements in the Manufacture of Concentrated Acetic Acid, of which the following is a specification.

This invention relates to a method of manufacturing concentrated acetic acid by treating acetate of lime wholly or partially dissolved in acetic acid by means of sulfurous acid. This method enables an almost theoretical yield to be produced and secondary reactions to be avoided and has, besides, the advantage that sulfurous acid can be employed in an anhydrous state, which prevents the acetic acid produced from being uselessly weakened by water. Moreover, this method of decomposing the acetate of lime is much less expensive than any of the methods known hitherto. A further important point is that after the acetic acid has been separated a residue of sulfite of lime remains, which in this state or converted into bisulfite of lime has considerable value. The concentrated acetic acid absorbs at a temperature of 15° centigrade about twenty per cent. of sulfurous acid and in this state dissolves the acetate of lime much more quickly than chemically-pure acetic acid.

The process may be carried out, for example, by first saturating one part of highly-concentrated acetic acid with one-fifth of its weight of sulfurous acid and then introducing one-half part of acetate of lime. This mixture is stirred slowly for some hours. The decomposition having been completed, a quantity of sulfurous acid equal to the first is introduced afresh into the mixture and a corresponding quantity of acetate of lime then added. When the operation is completed, a very fluid mass is obtained. The strength of the acetic acid used for solvent should not be below fifty per cent. and must be, of course, higher proportionate to the strength of the acetic acid wanted. The decomposition of the acetate of lime is effectuated according to the following equation:

$$Ca(C_2H_3O_2)_2 + SO_2H_2O = CaSO_3 + 2HC_2H_3O_2.$$

The same shows that one molecule of water is necessary for the reaction. Therefore if glacial acetic acid is to be produced a certain quantitity of water ought to be added to the mixture when glacial is used for solvent; but the commercial acetate of lime contains generally a quantity of water just sufficient for its decomposition by means of sulfurous acid, and there is no need for adding any further quantity. This proves that glacial acetic acid may be obtained by our process directly from commercial acetate of lime when glacial acetic acid is used for solvent. The acetic acid added, as well as that resulting from the decomposition, is separated from the sulfite of lime by filtration, by centrifugalizing, or by distillation.

Having now fully described our invention, what we claim, and desire to secure by Letters Patent, is—

1. The improvement in the art of manufacturing concentrated acetic acid, consisting in dissolving acetate of lime in concentrated acetic acid and decomposing it by means of sulfurous acid.

2. The improvement in the art of manufacturing concentrated acetic acid, consisting in dissolving acetate of lime in concentrated acetic acid and decomposing it by means of anhydrous sulfurous acid.

3. The improvement in the art of manufacturing concentrated acetic acid, consisting in saturating one part of concentrated acetic acid with one-fifth of its weight of sulfurous acid, then introducing one-half part of acetate of lime, stirring the mixture until decomposition has been completed, introducing a quantity of sulfurous acid equal to the first and a corresponding quantity of acetate of lime, and finally separating the acetic acid from the sulfite of lime produced.

4. The method of manufacturing concentrated acetic acid consisting in dissolving acetate of lime in concentrated acetic acid, containing at least fifty per cent. $C_2H_4O_2$, and decomposing it by means of sulfurous acid.

In testimony whereof we have hereunto set our hands in presence of two witnesses.

JOHANN GOTTLIEB BEHRENS.  
AUGUST BEHRENS, JR.

Witnesses:  
F. A. BRYCE,  
FR. HOYERMANN.